(No Model.) 2 Sheets—Sheet 1.
J. RICHARDS.
SINGLE ACTING ENGINE.
No. 328,521. Patented Oct. 20, 1885.
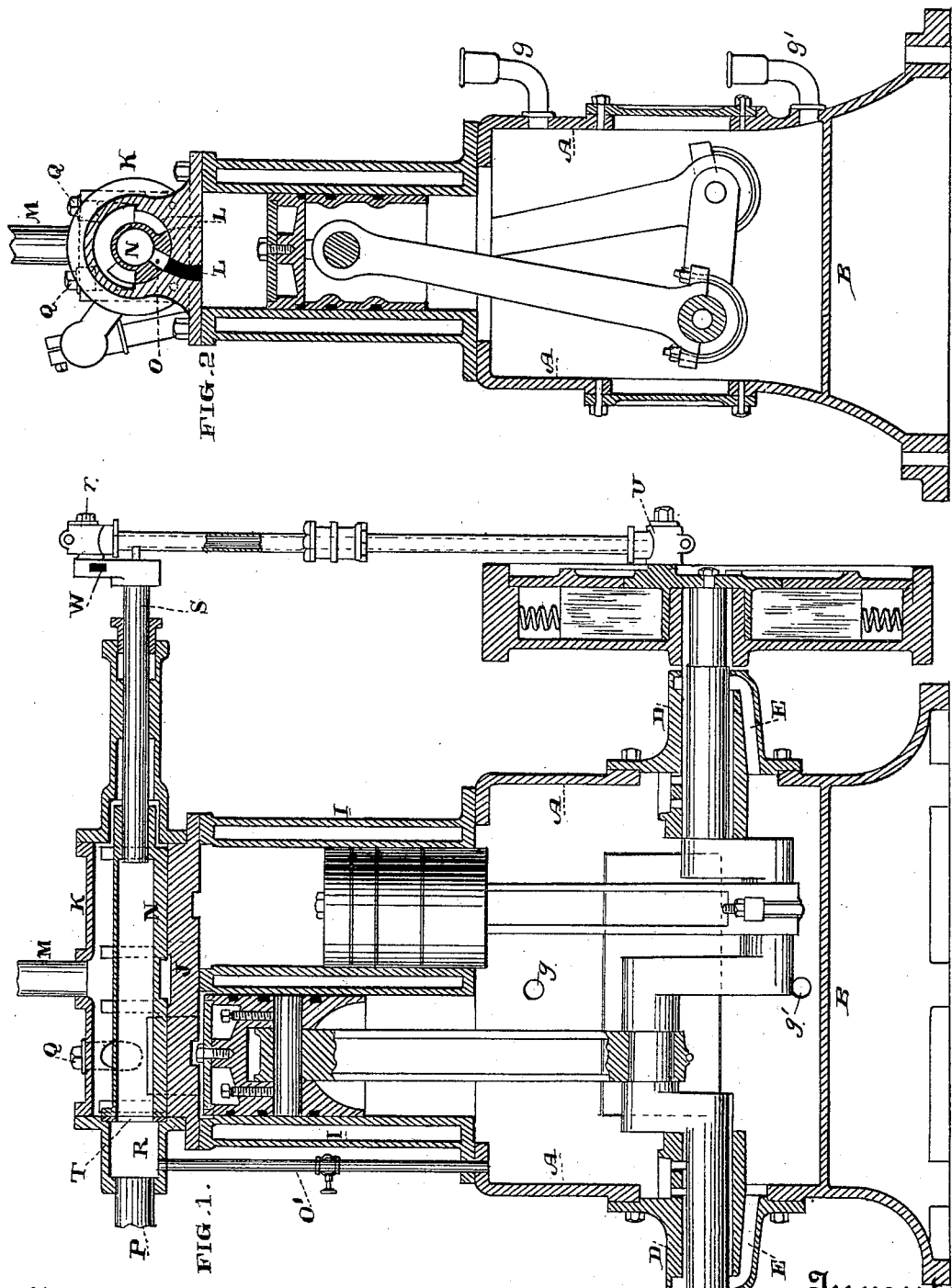
Witnesses,
Geo. H. Strong.
J. L. Morse.
Inventor,
John Richards
By Dewey & Co.
Attorneys
N. PETERS. Photo-Lithographer, Washington, D. C.

(No Model.) 2 Sheets—Sheet 2.

J. RICHARDS.
SINGLE ACTING ENGINE.

No. 328,521. Patented Oct. 20, 1885.

Witnesses
Geo. H. Strong.
J. H. Truss.

Inventor
John Richards
By Dewey & Co.
Attorneys

UNITED STATES PATENT OFFICE.

JOHN RICHARDS, OF SAN FRANCISCO, CALIFORNIA.

SINGLE-ACTING ENGINE.

SPECIFICATION forming part of Letters Patent No. 328,521, dated October 20, 1885.

Application filed March 16, 1885. Serial No. 159,079. (No model.)

*To all whom it may concern:*

Be it known that I, JOHN RICHARDS, of the city and county of San Francisco, State of California, have invented an Improvement in Single-Acting Engines; and I hereby declare the following to be a full, clear, and exact description of the same.

My invention relates to certain improvements in steam-engines of the single-acting type wherein the steam acts upon one side of the cylinder only.

My invention consists in the construction and combination of devices, all of which will be hereinafter described, and pointed out in the claims.

Figure 4:
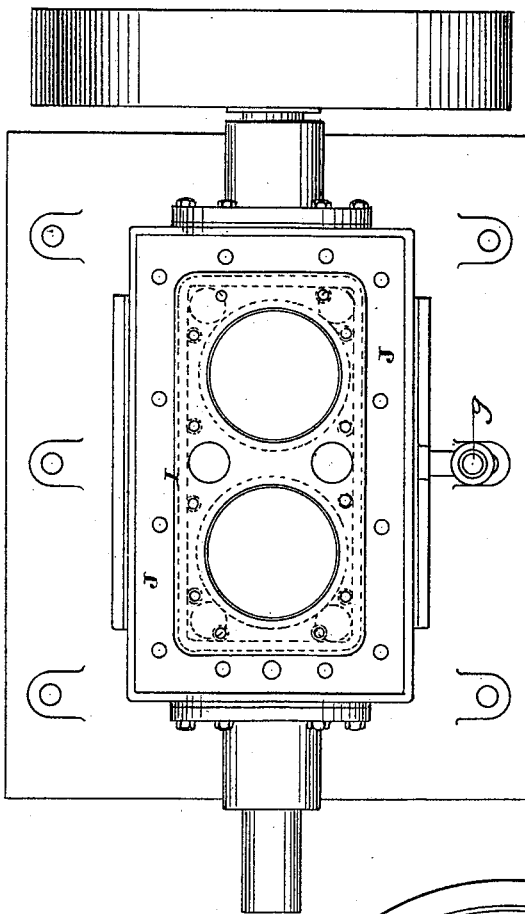
Figure 3:
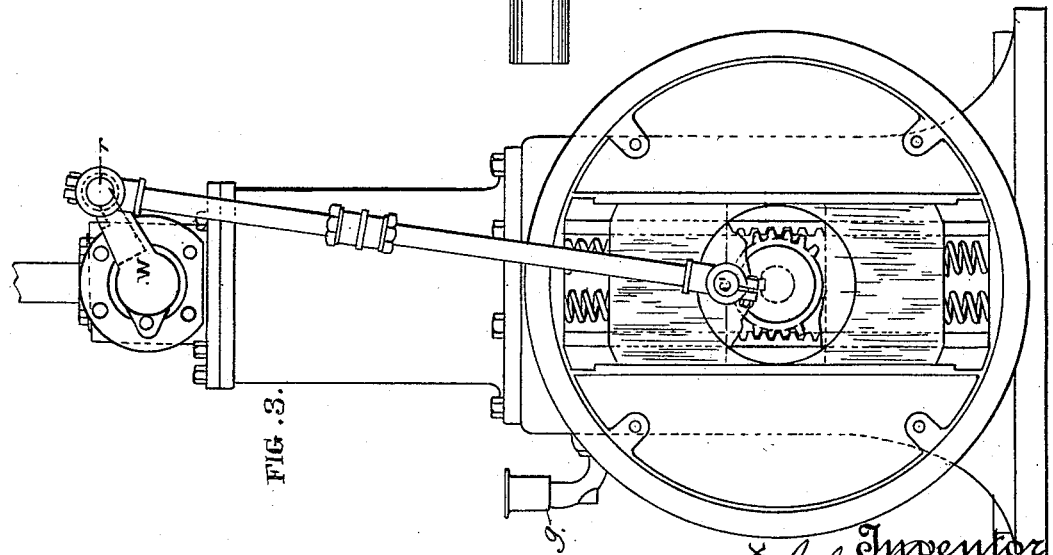

In the accompanying drawings, Figure 1 is a longitudinal vertical section through the steam-cylinders of my engine. Fig. 2 is a transverse section through one of the steam-cylinders and main frame. Fig. 3 is an end view showing the means for operating and regulating the valve. Fig. 4 is a plan or top view.

A is the main frame of my engine, which is preferably made in the form of a hollow box, and it may have doors upon either side which will permit access to the cranks and connections. A diaphragm, B, extends across the lower part of this case, and when the doors are in place the whole is inclosed so as to contain lubricating-fluid, of which a sufficient quantity is placed in the chamber, so that the cranks will at each revolution pass into it, and thus by violent agitation cause thorough lubrication of the crank-shaft, upper bearing-connection, and also the steam-pistons.

The crank-shaft is formed solid in one piece, with oppositely-placed cranks, and is journaled in flanged shells D D. These shells are bolted to the main frame, as shown, and at their outer ends have an annular chamber to arrest the flow of surplus oil, which is returned to the crank-chamber through the inclined ducts E E, Fig. 1. The curved nozzle g' shows by inspection the quantity of lubricating-fluid in the crank-chamber, and the one g serves to receive the lubricant, which is to be added from time to time, and when required it also permits the escape of air or vapor which may be generated in or enter the casing.

The steam-cylinders are plain tubes, preferably formed integrally with the rectangular box of the frame I, which surrounds them, and which is clearly shown in Fig. 4. This rectangular casing entirely surrounds the cylinders, and being also closed at both ends holds a stratum of air, which, without circulation, becomes a sufficient non-conductor of heat to prevent loss from radiation, and consequent condensation of steam in the cylinders. The cylinders are covered by a plate, J, which also carries the valve-case K, which is cast upon its top. This plate or housing has two steam-ports, L L—one leading to each cylinder.

Steam is admitted at M, filling the chamber around the valve N, and passing alternately into the two cylinders as the valve oscillates from right to left.

It will be noticed that by the employment of the central or axial exhaust-passage through the center of the valve the ports L L may extend wholly across the diameter of the cylinders; or, in other words, be double the length that would be possible with exhaust-ports normal to the axis of the valve, thereby reducing the length or range of the valve-movement and its actuating mechanism.

The valve has faces, as shown in Fig. 2, which pass over the ports L L, leading to the cylinders, and it has exhaust-ports O passing through these faces and communicating with its interior, the valve being hollow, so as to permit the exhaust-steam to pass out through the pipe P.

At Q Q are two apertures through which the position of the valve can be observed for adjustment.

The exposed or unbalanced area of the valve at the end R is as the relative areas of the exhaust-passage and the valve-stem S. This serves to keep the valve closely against the junk-ring T and prevent the escape of steam from the valve-chamber. The exposed or unbalanced area laterally is as the area of the steam-ports L, and is only enough to keep the valve firmly to its seat without causing undue friction. There being but one steam-port for each cylinder, this downward pressure on the valve is much less than in the case of common engines, where an exhaust-port of large area is required.

The mechanism for actuating the valve consists of a crank, U, and connecting rod or link V, which unites it with the end of a longer arm or crank, W, which is keyed to the end of the valve-stem S, so that by the revolution of the crank U, which is driven from the main engine-shaft, the arm W is caused to oscillate and thus move the valve.

The crank or rocker arm W is made hollow, and has an oil-chamber communicating with the crank-pin $r$, and thus through the hollow link $v$ to the crank-pin $c'$, so that oil poured in at W finds its way to both pins.

The pipe O', Fig. 1, is for the purpose of supplying water from the exhaust-steam to the crank-box when required.

The main connecting rods or links which connect the pistons with the crank are made of double-channel section to secure stiffness, and with broad ends to resist thrust. The caps are held by stirrups, as shown at Fig. 2.

I do not claim in this application the governor and its operating mechanism, but reserve to myself the right of making a separate application for these features.

Having thus described my invention, what I claim as new, and desire to secure by Letters Patent, is—

1. The combination, with the casing and the vertically-arranged cylinders having their lower ends open, of a valve-case, a plate, J, cast integral with the valve-case and closing the upper ends of the cylinders, a steam-space between the valve and upper part of casing, an oscillating valve having passages in its side for the admission of steam to the cylinders, two ports opening into the center of the valve, and an exhaust-passage through and in line with its axis, substantially as described.

2. In a single-acting engine, the combination of the vertically-arranged cylinders having their lower ends open and their upper ends closed, a valve-case extending transversely across the cylinders, and having a plate which forms the upper closed end of the cylinder, said plate being formed integral with the casing, and having ports for the admission and escape of steam, a semi-cylindrical valve having an axial exhaust and oscillating in the casing, a space between the upper part of valve and casing, and a steam-pipe and an exhaust-pipe placed in line with the axis of the valve, all substantially as herein described.

3. In a single-acting engine, the rectangular continuous frame extending from the base of the engine to the top of the cylinders, the lower portion containing an oil-reservoir and the top surrounding the cylinders forming a heat-retaining jacket, in combination with a valve-case having a plate cast integral with said casing and adapted to close the upper ends of the cylinders, substantially as herein described.

4. In a single-acting engine, the casing, the vertical cylinders, pistons, and an oscillating valve, in combination with a hollow rocker-arm, tubular connecting-rod, and an overhung eccentric crank, substantially as herein described.

5. In a single-acting engine, the vertically-arranged cylinders, the pistons moving therein and connected with the crank-shaft journaled in line below them, in combination with the valve-chamber extending transversely across the upper ends of the cylinders, ports connecting it with said cylinders, a hollow semi-cylindrical valve, having passages by which steam is admitted to the cylinders at each oscillation, ports extending through its sides to allow the exhaust-steam to escape into the interior and thence through one end, and a valve-ring, T, placed between the end of the valve and the interior end of the valve-chamber, substantially as herein described.

In witness whereof I have hereunto set my hand.

JOHN RICHARDS.

Witnesses:
S. H. NOURSE,
H. C. LEE.